Aug. 18, 1925.
C. R. MOHR
1,549,786
WATER SUPPLY SYSTEM
Filed June 28, 1924
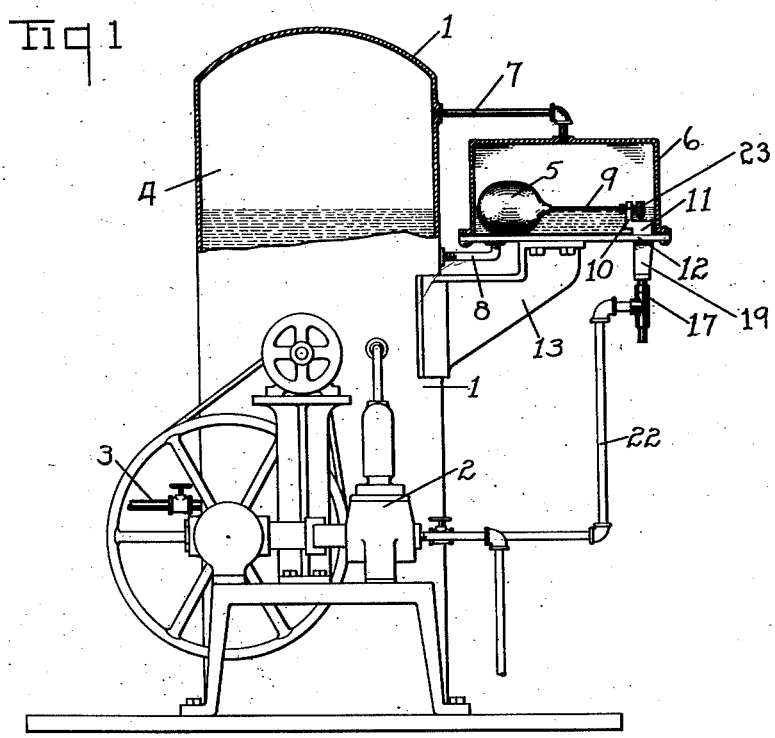
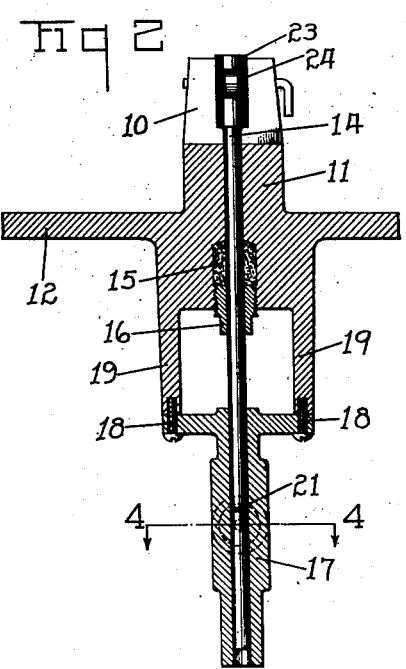
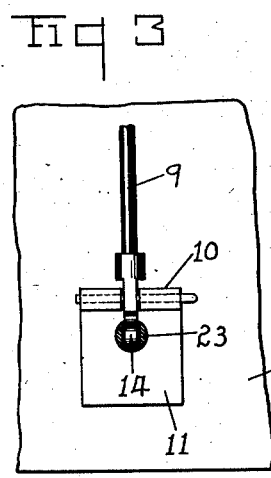
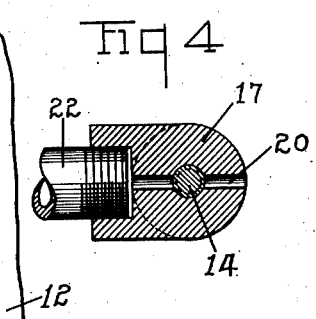
Inventor
Clark R. Mohr.
By Owen, Owen & Crampton
Attorney Patented Aug. 18, 1925.

1,549,786

UNITED STATES PATENT OFFICE.

CLARK R. MOHR, OF DELTA, OHIO.

WATER-SUPPLY SYSTEM.

Application filed June 28, 1924. Serial No. 722,922.

*To all whom it may concern:*

Be it known that I, CLARK R. MOHR, a citizen of the United States, and a resident of Delta, in the county of Fulton and State of Ohio, have invented a new and useful Improved Water-Supply System, which invention is fully set forth in the following specification.

My invention has for its object to provide an automatic means for controlling the quantity of air directed into a tank for supplying water under pressure, to maintain a sufficient quantity of air within the tank that the system will have greatest possible elasticity and yet provide for the supply of a sufficient amount of water for ordinary purposes on one hand, and on the other, prevent rigidity of direct supply from the pump of the system.

In water supply systems commonly used for domestic purposes, the water is supplied to a tank from any source by means of an electrically operated pump. The pumps are usually provided with an automatic control, dependent upon the pressure within the tank and so that when the pressure falls below a certain point, the pump will begin to operate to fill the tank and they usually continue until the pressure is considerably above the starting pressure. Such pumps usually have a manually operated air inlet valve whereby a small quantity of air is drawn into the pump and introduced into the tank with the water. Other pumps have an air pump that works with the water pump to pump air into the tank while the water is also being pumped into the tank, the air pump being also controlled by a suitable inlet valve that is set to a certain opening. It is utterly impossible for the layman and even the expert mechanic to so adjust the air valves that there will not be either an over-supply or under-supply of air to the tank. Furthermore the water will absorb the air and carry the air away with it. This air supply as well as the absorption thereof is moreover dependent somewhat on the temperature which is constantly changing by reason of atmospheric changes in temperature. Because of the fact that the domestic water supply systems commonly used do not have any means for regulating the air supplied to the tank, the tanks become completely filled with water and the required pressure for the control of the electric motor of the pump is reached immediately. Upon withdrawal of a very small amount of water, the pressure is immediately reduced sufficient to cause the pump to start as soon as the first of the water is withdrawn and to stop as quickly as the water is shut off. This results in pounding and even in breaking the connections of the system as well as of the pump, since there is no air for cushioning purposes. When the tank has the proper amount of air, however, the water will be ejected by the pressure of the air within the tank until the pressure falls below the starting pressure point, and the pump will continue to supply water to the tank until the pressure passes the maximum pressure point for which the automatic switch is set. Thus the pump will operate over a relatively considerable period of time in supplying water to the tank, by reason of the compressibility of the air, and a considerable quantity of water may be withdrawn without starting the electric motor of the pump. On the other hand, if the tank contains too much air, the water contained in the tank will be quickly drawn off, which will then result in the entire loss of the surplus air in the tank, as the air will pass out of the faucet or fixture that is opened. The pressure will drop immediately to zero. If a hot water faucet should be opened, the air from the water system will rush into the hot water tank or heater and cause damage or even severe accident, as the heating apparatus could not circulate against air and if the air remains in the hot water storage tank, it will cause the heater either to burn out or blow up.

By my invention the air inlet of the pump is automatically controlled to maintain a sufficient proportionate quantity of air to the water. When therefore the tank contains a greater proportionate amount, the air inlet of the pump is opened and until the air quantity is sufficient to restore the ratio between the volume of air and the volume of water within the tank, whereupon the air intake is closed.

The invention may be contained in structures which in their details may vary. To illustrate a practical application of the invention, I have shown in the accompanying drawings, a water supply system having my improvement attached thereto and I shall describe the same hereinafter.

Figure 1 illustrates the improved water supply system. Figure 2 illustrates a sectional view of the automatically controlled air intake valve. Figure 3 is a top view of a part of the mechanism shown in Fig. 1. Figure 4 is a view of the section taken on the line 4—4 indicated in Fig. 2.

The invention may be applied to any of the well known forms of water supply systems commonly used by those remote from a municipal or central supply system. Such water supply systems are commonly found in small villages and in the country. Such supply systems are dependent on the compressibility of air to provide a copious supply to the users of the system. In the form of system shown in the drawings, the vertical tank 1 receives water from the pump 2 that is drawn from any source such as from a river or creek or well. The pump 2 pumps the water directly into the tank 1 in the manner well known in the art. The pipe 3 leads from the tank 1 to the different faucets and valves through which the water is distributed. Such systems are usually provided with a small valve which permits the air to enter with the water into the tank to supply the required amount of air to give elasticity to the system. This air collects at the top of the tank, such as at 4. If the air controlled valve is not opened at the proper times, the water will carry away the air with the result that the tank will be entirely filled with water, and immediately on withdrawing any water the pressure falls to such a point that the pump is caused to immediately start, and immediately upon shutting off the water, the pump of necessity must come to an immediate standstill. Because of the limitations of the construction this is impossible, which results in damage to the pump and to the joints of the parts that form the water system. To maintain the air within the tank in proper volume at pressures that vary from the pump starting pressure, namely, the minimum pressure, to the pump stopping pressure, namely, the maximum pressure, I have provided a float 5 located in a box or shell 6. The shell or box 6 is connected to the tank 1 at points above and below the proper water level as by means of pipes 7 and 8, and so that until the water in the tank 1 falls below the level of the top of the pipe 8 or rises above the top of the shell 6, the level of the water within the shell 6 will be the same as the level of the water in the tank 4. The float 5 is connected to the air intake valve of the pump 2 so as to regulate the supply of the air to the pump 2 according to whether the level of the water in the tank 1 is above or below the proper proportionate ratio as between the air and the water in the tank.

The float 5 is located on the end of a lever 9 that is pivotally supported on an arm 10 that protrudes from the block 11. The float 5 is preferably formed of hard rubber in order that it may sustain the high air pressure to which it is subjected. The block 11 may be formed integrally with the base plate 12 that closes the shell 6 and which is supported by means of the bracket 13 that may be attached to the tank 1. The end of the lever 9 is connected to a valve rod 14 that extends through the block 11. The rod 14 is provided with a head 23 having a slot 24 into which the end of the lever 9 may be inserted for the purpose of connecting the lever 9 with the rod 14. A suitable packing material 15 and a packing nut 16 may be used to seal the space between the rod 14 and the surface of the opening in the block 11 in which the rod is located, and prevent the escape of water notwithstanding the high pressure to which the water may be subjected. A sleeve or valve casing 17 may be connected to the block 11 by means of screws 18 that extend through a flange formed on the valve casing 17. The block 11 may be provided with two projecting flanges or sides 19 into which the screws 18 may be threaded to secure the valve casing 17 in position. The valve rod 14 extends substantially through the sleeve or valve casing 17. A transverse opening 20 is formed in the valve casing 17 while the rod 14 is provided with a groove 21 that is located in proximity to the transverse opening 20 and so that when the float 5 is lifted, the rod 14 will be moved down so as to place the groove 21 in line with the passageway 20. This will open the passageway through the valve casing 17. When, therefore, the rod 14 is raised by the float 5 being depressed, the passageway 20 will be closed.

A pipe 22 is connected to the casing 17 at the point where the passageway 20 is formed. The pipe 22 connects with the air inlet of the pump 2 and so that when the passageway 20 is opened by the valve rod 14, the pump will draw air into it and force the air into the tank 1 whereby the air quantity within the tank will be increased and the pressure will be due to the compressed air which will be additional in amount if not in volume. However, on opening of any of the outlets of the system, the water will be withdrawn, which will immediately establish the required proportionate air volume to the amount of the water within the tank. Thus the proper ratio between the air and the water in the tank will be immediately restored and an over-supply of either to the tank will be prevented, and the proper air and water conditions, for efficient service, will thus be maintained.

I claim:—

1. In a water supply system, the combination with a tank and a pump for supplying air and water to the tank, a shell, the bottom and the top of the shell connected to the tank, an air intake valve located on the outside of the shell for controlling the supply of the air to the pump and controlled by the level of the water in the shell.

2. In a water supply system, the combination with a tank and a pump for supplying air and water to the tank, a shell, the bottom and the top of the shell connected to the tank, an air intake valve located on the outside of the shell for controlling the supply of the air to the pump, an air pipe located entirely on the outside of the shell and connected to the tank, a float connected to the valve for controlling the valve according to the level of the water in the shell.

3. In combination with a tank and a pump for supplying water and air to the tank under pressure, a shell, the interior of the shell communicating with the interior of the tank through the top and the bottom of the shell, and at points above and below the shell, a lever pivotally supported in the shell, a valve casing secured to the shell and extending to the outside of the shell, a valve rod extending through the shell and connected to the lever, a float located on the end of the lever and raised and lowered by the change in the level of the water in the shell, the valve casing having an air inlet located on the outside of the shell of the pump and controlled by the valve rod.

In testimony whereof I have hereunto signed my name to this specification.

CLARK R. MOHR.